United States Patent
Budnick et al.

(10) Patent No.: US 9,982,561 B2
(45) Date of Patent: May 29, 2018

(54) HEAT SHIELD FOR COOLING A STRUT

(71) Applicant: United Technologies Corporation, Hartford, CT (US)

(72) Inventors: Matthew Budnick, Tolland, CT (US); Conway Chuong, Manchester, CT (US); Jonathan Ariel Scott, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 308 days.

(21) Appl. No.: 14/650,956

(22) PCT Filed: Dec. 19, 2013

(86) PCT No.: PCT/US2013/076377
§ 371 (c)(1),
(2) Date: Jun. 10, 2015

(87) PCT Pub. No.: WO2014/105599
PCT Pub. Date: Jul. 3, 2014

(65) Prior Publication Data
US 2015/0330248 A1    Nov. 19, 2015

Related U.S. Application Data

(60) Provisional application No. 61/747,225, filed on Dec. 29, 2012.

(51) Int. Cl.
*F01D 25/14* (2006.01)
*F01D 25/24* (2006.01)
(Continued)

(52) U.S. Cl.
CPC ............. *F01D 25/14* (2013.01); *F01D 5/081* (2013.01); *F01D 9/02* (2013.01); *F01D 9/065* (2013.01);
(Continued)

(58) Field of Classification Search
CPC . F01D 25/14; F01D 5/081; F01D 9/02; F01D 9/065; F01D 25/12; F01D 25/145;
(Continued)

(56) References Cited

U.S. PATENT DOCUMENTS

| 2,214,108 A | 9/1940 | Nichols |
| 3,576,328 A | 4/1971 | Vase |

(Continued)

FOREIGN PATENT DOCUMENTS

| EP | 0344877 A1 | 12/1989 |
| EP | 2187019 A1 | 5/2010 |

(Continued)

OTHER PUBLICATIONS

International Searching Authority, PCT Notification of Transmittal of the International Search Report and the Written Opinion, dated Apr. 15, 2014, 14 pages.

(Continued)

*Primary Examiner* — Aaron R Eastman
(74) *Attorney, Agent, or Firm* — Kinney & Lange, P.A.

(57) ABSTRACT

An assembly for a gas turbine engine includes a strut and a heat shield. The heat shield is disposed adjacent the strut and the heat shield and is adapted to contain a cooling air flow that passes along first cavity between the heat shield and the strut.

17 Claims, 3 Drawing Sheets

(51) Int. Cl.
  *F01D 25/12* (2006.01)
  *F02C 7/12* (2006.01)
  *F01D 9/02* (2006.01)
  *F01D 9/06* (2006.01)
  *F01D 25/16* (2006.01)
  *F01D 5/08* (2006.01)

(52) U.S. Cl.
  CPC ............ *F01D 25/12* (2013.01); *F01D 25/145* (2013.01); *F01D 25/162* (2013.01); *F01D 25/24* (2013.01); *F02C 7/12* (2013.01); *F05D 2220/32* (2013.01); *F05D 2260/231* (2013.01); *Y02T 50/673* (2013.01); *Y02T 50/676* (2013.01)

(58) Field of Classification Search
  CPC .......... F01D 25/24; F01D 25/162; F02C 7/12; F05D 2220/32; F05D 2260/231; Y02T 50/673; Y02T 50/676
  USPC ........................................................ 415/116
  See application file for complete search history.

(56) References Cited

U.S. PATENT DOCUMENTS

| | | | |
|---|---|---|---|
| 3,802,046 A | 4/1974 | Wachtell et al. | |
| 3,970,319 A | 7/1976 | Carroll et al. | |
| 4,009,569 A | 3/1977 | Kozlin | |
| 4,044,555 A | 4/1977 | McLoughlin et al. | |
| 4,088,422 A | 5/1978 | Martin | |
| 4,114,248 A | 9/1978 | Smith et al. | |
| 4,305,697 A | 12/1981 | Cohen et al. | |
| 4,321,007 A * | 3/1982 | Dennison | F01D 9/065 415/142 |
| 4,369,016 A * | 1/1983 | Dennison | F01D 9/065 415/142 |
| 4,478,551 A | 10/1984 | Honeycutt, Jr. et al. | |
| 4,645,217 A | 2/1987 | Honeycutt, Jr. et al. | |
| 4,678,113 A | 7/1987 | Bridges et al. | |
| 4,738,453 A | 4/1988 | Ide | |
| 4,756,536 A | 7/1988 | Belcher | |
| 4,793,770 A | 12/1988 | Schonewald et al. | |
| 4,920,742 A | 5/1990 | Nash et al. | |
| 4,987,736 A | 1/1991 | Ciokajlo et al. | |
| 4,989,406 A | 2/1991 | Vdoviak et al. | |
| 4,993,918 A | 2/1991 | Myers et al. | |
| 5,031,922 A | 7/1991 | Heydrich | |
| 5,042,823 A | 8/1991 | Mackay et al. | |
| 5,071,138 A | 12/1991 | Mackay et al. | |
| 5,076,049 A | 12/1991 | VonBenken et al. | |
| 5,100,158 A | 3/1992 | Gardner | |
| 5,108,116 A | 4/1992 | Johnson et al. | |
| 5,169,159 A | 12/1992 | Pope et al. | |
| 5,174,584 A | 12/1992 | Lahrman | |
| 5,188,507 A | 2/1993 | Sweeney | |
| 5,211,541 A | 5/1993 | Fledderjohn et al. | |
| 5,236,302 A | 8/1993 | Weisgerber et al. | |
| 5,246,295 A | 9/1993 | Ide | |
| 5,265,807 A | 11/1993 | Steckbeck et al. | |
| 5,269,057 A | 12/1993 | Mendham | |
| 5,272,869 A | 12/1993 | Dawson et al. | |
| 5,273,397 A | 12/1993 | Czachor et al. | |
| 5,292,227 A | 3/1994 | Czachor et al. | |
| 5,312,227 A | 5/1994 | Grateau et al. | |
| 5,338,154 A | 8/1994 | Meade et al. | |
| 5,357,744 A | 10/1994 | Czachor et al. | |
| 5,370,402 A | 12/1994 | Gardner et al. | |
| 5,385,409 A | 1/1995 | Ide | |
| 5,401,036 A | 3/1995 | Basu | |
| 5,438,756 A | 8/1995 | Halchak et al. | |
| 5,474,305 A | 12/1995 | Flower | |
| 5,483,792 A | 1/1996 | Czachor et al. | |
| 5,558,341 A | 9/1996 | McNickle et al. | |
| 5,597,286 A * | 1/1997 | Dawson | F01D 9/065 415/115 |
| 5,605,438 A | 2/1997 | Burdgick et al. | |
| 5,609,467 A | 3/1997 | Lenhart et al. | |
| 5,632,493 A | 5/1997 | Gardner | |
| 5,634,767 A | 6/1997 | Dawson | |
| 5,691,279 A | 11/1997 | Tauber et al. | |
| 5,755,445 A | 5/1998 | Arora | |
| 5,851,105 A | 12/1998 | Fric et al. | |
| 5,911,400 A | 6/1999 | Niethammer et al. | |
| 6,163,959 A | 12/2000 | Arraitz et al. | |
| 6,196,550 B1 | 3/2001 | Arora et al. | |
| 6,227,800 B1 | 5/2001 | Spring et al. | |
| 6,337,751 B1 | 1/2002 | Kimizuka | |
| 6,343,912 B1 | 2/2002 | Mangeiga et al. | |
| 6,358,001 B1 | 3/2002 | Bosel et al. | |
| 6,364,316 B1 | 4/2002 | Arora | |
| 6,439,841 B1 | 8/2002 | Bosel | |
| 6,511,284 B2 | 1/2003 | Darnell et al. | |
| 6,578,363 B2 | 6/2003 | Hashimoto et al. | |
| 6,601,853 B2 | 8/2003 | Inoue | |
| 6,612,807 B2 | 9/2003 | Czachor | |
| 6,619,030 B1 | 9/2003 | Seda et al. | |
| 6,638,013 B2 | 10/2003 | Nguyen et al. | |
| 6,652,229 B2 | 11/2003 | Lu | |
| 6,672,833 B2 | 1/2004 | MacLean et al. | |
| 6,719,524 B2 | 4/2004 | Nguyen et al. | |
| 6,736,401 B2 | 5/2004 | Chung et al. | |
| 6,792,758 B2 | 9/2004 | Dowman | |
| 6,796,765 B2 | 9/2004 | Kosel et al. | |
| 6,805,356 B2 | 10/2004 | Inoue | |
| 6,811,154 B2 | 11/2004 | Proctor et al. | |
| 6,935,631 B2 | 8/2005 | Inoue | |
| 6,969,826 B2 | 11/2005 | Trewiler et al. | |
| 6,983,608 B2 | 1/2006 | Allen, Jr. et al. | |
| 7,055,305 B2 | 6/2006 | Baxter et al. | |
| 7,094,026 B2 | 8/2006 | Coign et al. | |
| 7,100,358 B2 | 9/2006 | Gekht et al. | |
| 7,200,933 B2 | 4/2007 | Lundgren et al. | |
| 7,229,249 B2 | 6/2007 | Durocher et al. | |
| 7,238,008 B2 | 7/2007 | Bobo et al. | |
| 7,367,567 B2 | 5/2008 | Farah et al. | |
| 7,371,044 B2 | 5/2008 | Nereim | |
| 7,389,583 B2 | 6/2008 | Lundgren | |
| 7,614,150 B2 | 11/2009 | Lundgren | |
| 7,631,879 B2 | 12/2009 | Diantonio | |
| 7,673,461 B2 | 3/2010 | Cameriano et al. | |
| 7,677,047 B2 | 3/2010 | Somanath et al. | |
| 7,735,833 B2 | 6/2010 | Braun et al. | |
| 7,798,768 B2 | 9/2010 | Strain et al. | |
| 7,815,417 B2 | 10/2010 | Somanath et al. | |
| 7,824,152 B2 | 11/2010 | Morrison | |
| 7,891,165 B2 | 2/2011 | Bader et al. | |
| 7,909,573 B2 | 3/2011 | Cameriano et al. | |
| 7,955,446 B2 | 6/2011 | Dierberger | |
| 7,959,409 B2 | 6/2011 | Guo et al. | |
| 7,988,799 B2 | 8/2011 | Dierberger | |
| 8,069,648 B2 | 12/2011 | Snyder et al. | |
| 8,083,465 B2 | 12/2011 | Herbst et al. | |
| 8,091,371 B2 | 1/2012 | Durocher et al. | |
| 8,092,161 B2 | 1/2012 | Cai et al. | |
| 8,152,451 B2 | 4/2012 | Manteiga et al. | |
| 8,162,593 B2 | 4/2012 | Guimbard et al. | |
| 8,172,526 B2 | 5/2012 | Lescure et al. | |
| 8,177,488 B2 | 5/2012 | Manteiga et al. | |
| 8,221,071 B2 | 7/2012 | Wojno et al. | |
| 8,245,399 B2 | 8/2012 | Anantharaman et al. | |
| 8,245,518 B2 | 8/2012 | Durocher et al. | |
| 8,282,342 B2 * | 10/2012 | Tonks | F01D 9/065 415/116 |
| 8,371,127 B2 | 2/2013 | Durocher et al. | |
| 8,371,812 B2 | 2/2013 | Manteiga et al. | |
| 2003/0025274 A1 | 2/2003 | Allan et al. | |
| 2003/0042682 A1 | 3/2003 | Inoue | |
| 2003/0062684 A1 | 4/2003 | Inoue | |
| 2003/0062685 A1 | 4/2003 | Inoue | |
| 2005/0046113 A1 | 3/2005 | Inoue | |
| 2005/0050898 A1 * | 3/2005 | Noda | F01D 5/081 60/772 |
| 2006/0010852 A1 | 1/2006 | Gekht et al. | |
| 2006/0123796 A1 | 6/2006 | Aycock et al. | |

(56) References Cited

U.S. PATENT DOCUMENTS

| | | |
|---|---|---|
| 2007/0025847 A1 | 2/2007 | Wakazono et al. |
| 2008/0216300 A1 | 9/2008 | Anderson et al. |
| 2010/0054927 A1* | 3/2010 | Almstedt .............. F01D 25/162 415/180 |
| 2010/0132371 A1 | 6/2010 | Durocher et al. |
| 2010/0132374 A1* | 6/2010 | Manteiga ................. F01D 9/02 60/796 |
| 2010/0132377 A1 | 6/2010 | Durocher et al. |
| 2010/0202872 A1 | 8/2010 | Weidmann |
| 2010/0236244 A1 | 9/2010 | Longardner |
| 2010/0275572 A1 | 11/2010 | Durocher et al. |
| 2010/0275614 A1 | 11/2010 | Fontaine et al. |
| 2010/0307165 A1 | 12/2010 | Wong et al. |
| 2011/0000223 A1 | 1/2011 | Russberg |
| 2011/0005234 A1 | 1/2011 | Hashimoto et al. |
| 2011/0020116 A1* | 1/2011 | Hashimoto ............. F01D 9/065 415/180 |
| 2011/0061767 A1 | 3/2011 | Vontell et al. |
| 2011/0081237 A1* | 4/2011 | Durocher ................. F01D 9/06 415/173.1 |
| 2011/0081239 A1 | 4/2011 | Durocher |
| 2011/0081240 A1 | 4/2011 | Durocher et al. |
| 2011/0085895 A1 | 4/2011 | Durocher et al. |
| 2011/0214433 A1 | 9/2011 | Feindel et al. |
| 2011/0262277 A1 | 10/2011 | Sjoqvist et al. |
| 2011/0302929 A1 | 12/2011 | Bruhwiler |
| 2012/0111023 A1 | 5/2012 | Sjoqvist et al. |
| 2012/0156020 A1 | 6/2012 | Kottilingam et al. |
| 2012/0186254 A1 | 7/2012 | Ito et al. |
| 2012/0204569 A1 | 8/2012 | Schubert |
| 2012/0227371 A1 | 9/2012 | Johnson et al. |
| 2013/0011242 A1 | 1/2013 | Beeck et al. |

FOREIGN PATENT DOCUMENTS

| | | |
|---|---|---|
| GB | 2226086 A | 6/1990 |
| WO | WO 03/020469 A1 | 3/2003 |
| WO | WO 2006/007686 A1 | 1/2006 |
| WO | WO 2009/157817 A1 | 12/2009 |
| WO | WO 2010/002295 A1 | 1/2010 |
| WO | WO2010002296 A1 | 1/2010 |
| WO | WO2011129724 A1 | 10/2011 |
| WO | WO 2012/158070 A1 | 11/2012 |

OTHER PUBLICATIONS

Extended European Search Report for EP Application No. 13868090.5, dated Feb. 15, 2016, 7 pages.

* cited by examiner

HEAT SHIELD FOR COOLING A STRUT

BACKGROUND

The disclosure relates to gas turbine engines, and more particularly to heat shields used in gas turbine engines.

Gas turbine engines operate according to a continuous-flow, Brayton cycle. A compressor section pressurizes an ambient air stream, fuel is added and the mixture is burned in a central combustor section. The combustion products expand through a turbine section where bladed rotors convert thermal energy from the combustion products into mechanical energy for rotating one or more centrally mounted shafts. The shafts, in turn, drive the forward compressor section, thus continuing the cycle. Gas turbine engines are compact and powerful power plants, making them suitable for powering aircraft, heavy equipment, ships and electrical power generators. In power generating applications, the combustion products can also drive a separate power turbine attached to an electrical generator.

For many stator vane assemblies, a fairing is disposed about a frame in order to define a main gas flow path for the gas turbine engine. As the fairing is directly exposed to gas flow including combustion gases, the fairing can be heated to high temperatures during operation. Heat from the fairing can heat the frame in an undesirable manner.

SUMMARY

An assembly for a gas turbine engine includes a strut and a heat shield. The heat shield is disposed adjacent the strut and the heat shield and is adapted to contain a cooling air flow that passes along a first cavity between the heat shield and the strut.

An assembly for a gas turbine engine includes a frame and a heat shield. The frame includes a strut and a casing. The heat shield is supported from the casing and disposed adjacent the strut to form a first cavity therebetween.

A stator assembly for a gas turbine engine includes a frame, a fairing, and a heat shield. The frame includes a strut. The fairing is disposed within the frame to form a main gas flow path for the gas turbine engine. The heat shield is disposed between the fairing and the strut, and the heat shield is adapted to separate a cooler air disposed in a first cavity that is formed between the heat shield and the strut from a warmer air disposed in a second cavity that is formed between the framing and the heat shield.

DETAILED DESCRIPTION

The present application discloses a heat shield that can be positioned around a strut and between the strut and a fairing. This heat shield can direct a cooler secondary air flow along the strut to maximize effectiveness of the cooler air in cooling the strut before allowing the air to move away from the strut. Additionally, the application discloses the heat shield can be attached to a cooler component (e.g., cooler than fairing) such as an inner casing of the frame. This configuration avoids attachment of the heat shield to the fairing, which is undesirable due to conduction heating from the fairing to the heat shield. As a result of the configurations disclosed, the gas turbine engine can experience increased efficiency and less expensive materials can be used for construction of the fairing.

Figure 1:
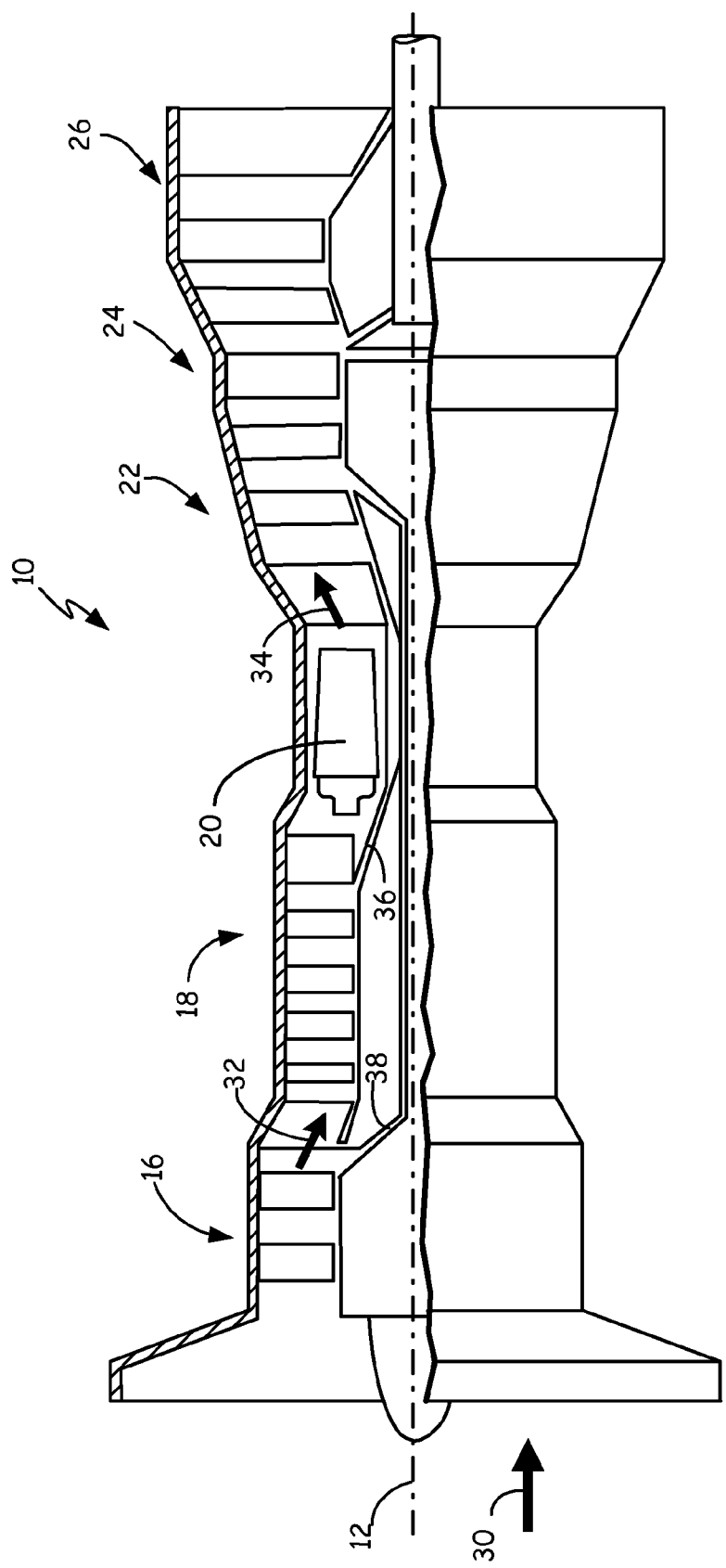
FIG. 1 is a quarter sectional view of an industrial turbine.

An exemplary industrial gas turbine engine 10 is circumferentially disposed about a central, longitudinal axis or axial engine centerline axis 12 as illustrated in FIG. 1. The engine 10 includes in series order from front to rear, low and high pressure compressor sections 16 and 18, a central combustor section 20 and high and low pressure turbine sections 22 and 24. In some examples, a free turbine section 26 is disposed downstream of the low pressure turbine 24. Although illustrated with reference to an industrial gas turbine engine, this application also extends to other configurations such as aero engines with a fan or gear driven fan, and engines with more or fewer sections than illustrated.

In gas turbines, incoming ambient air 30 becomes pressurized air 32 in the compressors 16 and 18. Fuel mixes with the pressurized air 32 in the combustor section 20, where it is burned to produce combustion gases 34 that expand as they flow through turbine sections 22, 24 and power turbine 26. Turbine sections 22 and 24 can rotate in response to the combustion gases 34 to drive high and low pressure rotor shafts 36 and 38 respectively, which in turn rotate the attached compressor sections 18, 16. Free turbine section 26 can, for example, drive an electrical generator, pump, gearbox, or other accessory (not shown).

It is understood that FIG. 1 provides a basic understanding and overview of the various sections and the basic operation of an industrial gas turbine engine. The present application is applicable to all types of gas turbine engines, including those with aerospace applications.

Figure 2:
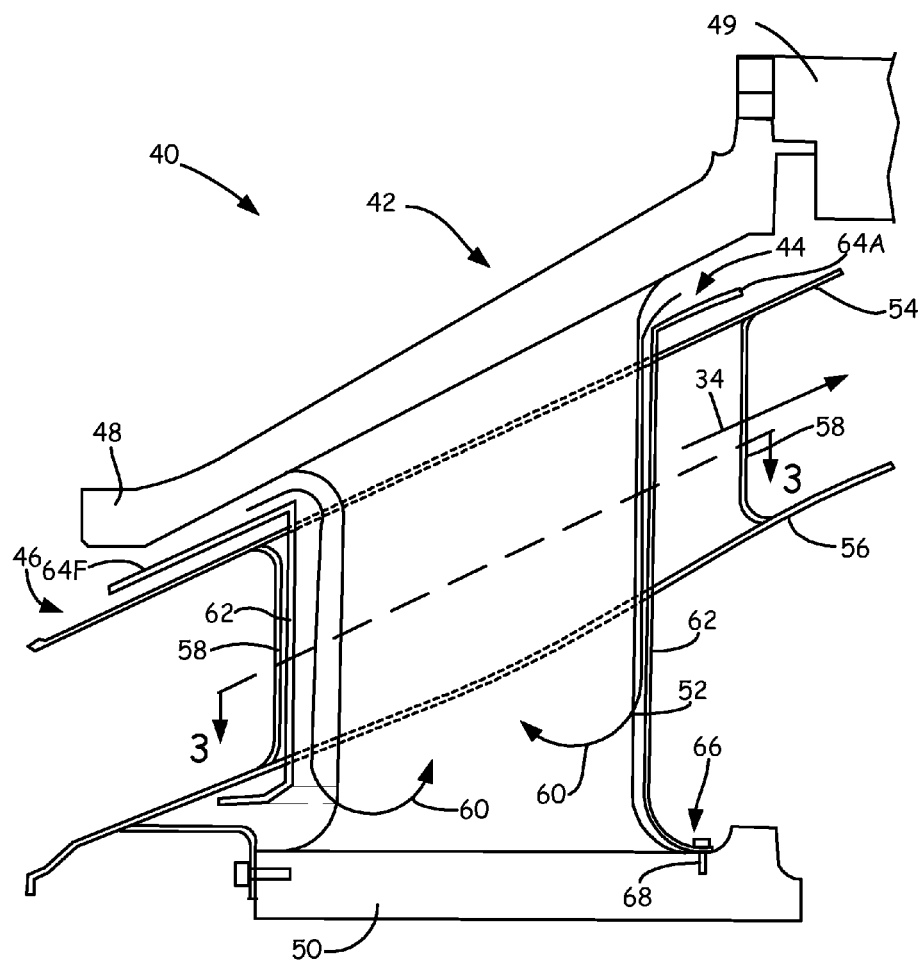
FIG. 2 is a cross-section of an assembly including a frame, a fairing, and a heat shield arranged together.

FIG. 2 shows a cross-section of assembly 40 with heat shield 44 installed between frame 42 and fairing 46. Assembly 40 includes frame 42, heat shield 44, and fairing 46. Frame 42 includes outer radial casing 48, inner radial casing 50, and struts 52. Fairing 46 includes outer radial platform 54, inner radial platform 56, and strut liners 58. Heat shield 44 includes strut shields 62, forward shield 64F, aft shield 64A, and mount portion 66.

Frame 42 comprises a stator component of gas turbine engine 10 (FIG. 1) and can form portions of compressor sections 16 and 18 or turbine sections 22 and 24. Heat shield 44 and fairing 46 are shown installed within frame 42 in FIG. 2. Both heat shield 44 and fairing 46 are connected to the frame 42. In FIG. 2, heat shield 44 is connected to frame 42 in a different location than fairing 46, in particular, fairing 46 is connected at or near a forward end of inner radial casing 50 and heat shield 44 is connected at or near an aft end of inner radial casing 50. Fairing 46 is disposed within the frame 42 to form at least a portion of the main gas flow path for a portion of gas turbine engine 10. It should be understood that the embodiments of heat shield 44 are provided in relation to a specific embodiment of frame 42, in particular, a frame that comprises a low pressure turbine exhaust case, but heat shield 44 described is applicable to other gas turbine sections and elements including stator vane components.

As illustrated in FIG. 2, outer radial casing 48 of frame 42 is conically shaped and forms a portion of the casing of gas turbine engine 10 (FIG. 1), for example, in low pressure turbine section 24. Outer radial casing 48 abuts and is connected to second outer radial casing 49 of another module of gas turbine engine 10. Inner radial casing 50 is disposed generally radially inward of outer radial casing 48 and is connected thereto by a plurality of circumferentially spaced struts 52 (only one is shown in FIG. 2).

Fairing 46 is adapted to be disposed within frame 42 between outer radial casing 48 and inner radial casing 50. Outer radial platform 54 of fairing 46 has a generally conical shape. Similarly, inner radial platform 56 has a generally conical shape. Inner radial platform 56 is spaced from outer radial platform 54 by strut liners 58. Strut liners 58 are adapted to be disposed around struts 52 of frame 42 as well as strut shields 62 of heat shield 44 when fairing 46 is assembled on frame 42 as illustrated in FIG. 2. As discussed previously, outer radial platform 54, inner radial platform 56, and strut liners 58, form at least a portion of the main gas flow path, which directs combustion gases 34 through the portion of gas turbine engine illustrated in FIG. 2.

As illustrated in FIG. 2, a secondary air flow 60, which is cooler than combustion gases 34, is provided and flows along struts 52. In particular, strut shields 62 of heat shield 44 act to contain secondary air flow 60 around struts 52 and generally direct secondary air flow 60 inward radially along a cavity between heat shield 44 and struts 52. This arrangement allows for a cooling air flow along struts 52 to keep struts 52 relatively cooler than other components such as fairing 46.

Heat shield 44 can be disposed between frame 42 and fairing 46. Strut shields 62 extend about struts 52 and are disposed between struts 52 and strut liners 58. Strut shields 62 extend from forward shield 64F and aft shield 64A. Strut shield 62 can initially be divided for installation around struts 52 and then welded, riveted, brazed, or otherwise connected together to form an uninterrupted segment with little or no gaps. Forward shield 64F and aft shield 64A are disposed between outer radial platform 54 and outer radial casing 48 and are connected together by welding, brazing, riveting or other means. In the embodiment of FIG. 2, forward shield 64F and aft shield 64A are adapted to direct secondary air flow 60 away from entering a cavity formed between heat shield 44 (in particular strut shields 62) and struts 52.

Each strut shield 62 extends generally radially inward from forward shield 64F and aft shield 64A. As illustrated in the embodiment of FIG. 2, an aft portion (downstream with respect to flow direction of combustion gases 34) of each strut shield 62 is adapted as mount portion 66. Mount portion 66 is located generally radially below and aft of strut shield 62. Mount portion 66 is adapted to connect to inner radial casing 50 of frame 42. This connection can be accomplished by welding, riveting, brazing, bolting, or other connection. In the embodiment of FIG. 2, mount portion 66 is connected to inner radial case 50 by one or more fasteners 68.

Attachment of heat shield 44 to frame 42 via mount portion 66 is desirable as it allows heat shield 44 to be attached to a cooler component such as frame 42. This configuration avoids attachment to fairing 46, which is undesirable due to conduction heating from fairing 46 to heat shield 44. In the embodiment shown in FIG. 2, strut shield 62, forward shield 64F, and aft shield 64A are connected to one another by welding, riveting, brazing, or other means of joining. In the embodiment shown in FIG. 2, strut shield 62, forward shield 64F, and aft shield 64A are supported by mount portion 66. In other embodiments, strut shield 62, forward shield 64F, and aft shield 64A can comprise separate components, can be segmented, or can comprise subassemblies of several components. Additionally, in other embodiments, one or more components of heat shield 44 such as strut shield 62, forward shield 64F, and aft shield 64A may not be connected together but instead are disposed with gaps therebetween. In yet other embodiments, one or more components of heat shield 44 such as strut shield 62, aft shield 64A, and/or forward shield 64F can be connected to and/or supported from other portions of frame 42 such as outer radial casing 48.

Figure 3:
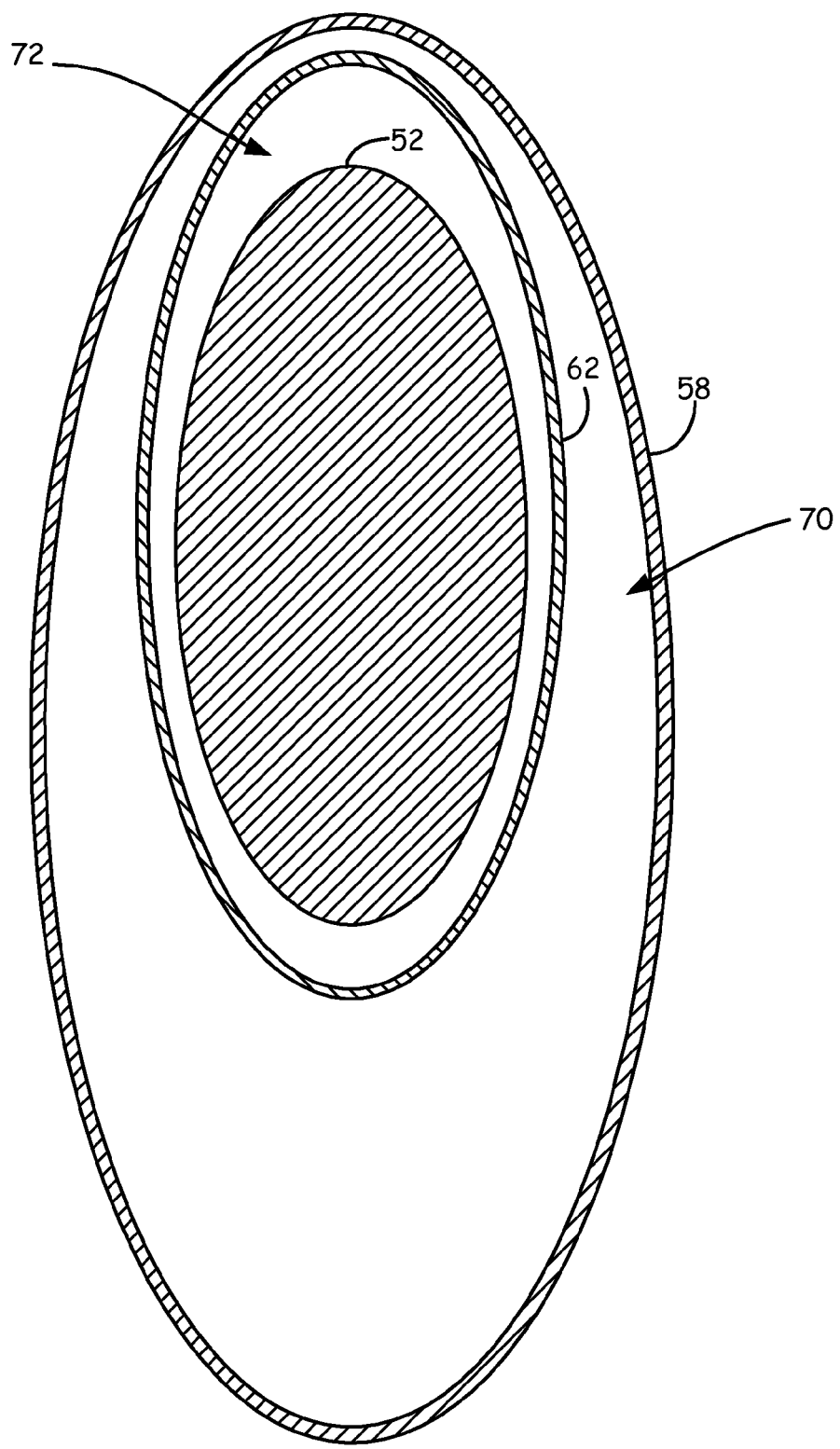
FIG. 3 is a cross-sectional view of the strut, fairing, and heat shield along section 3-3 of FIG. 2.

FIG. 3 is a cross-sectional view along 3-3 of FIG. 2. FIG. 3 is sectioned to extend through one strut 52, one strut shield 62, and one strut liner 58. First cavity 70 is defined between strut liner 58 and strut shield 62. Second cavity 72 is defined between strut shield 62 and strut 52.

As illustrated in FIG. 3, strut shield 62 a single uninterrupted segment with no gaps around the circumference. In other embodiments, strut shield 62 can be segmented with gaps or sections. As discussed previously, strut liner 58, strut shield 62 and strut 52 extend generally radially with respect to the centerline axis 12 of gas turbine engine 10 (FIG. 1). As illustrated in the embodiment of FIG. 3, a forward portion (upstream portion with respect to a direction of combustion gas 34 flow in FIG. 2) of strut shield 62 is disposed in close proximity to and generally confirms to a shape of a forward portion of strut liner 58. Similarly, as shown in FIG. 3, a rear portion (downstream portion with respect to a direction of combustion gas 34 flow in FIG. 2) of strut shield 62 is disposed in close proximity to and generally conforms to a shape of a rear portion of strut 52. Strut liner 58 is generally aerodynamically shaped to direct combustion gases 34 in a desired manner.

During operation, cavity 70 contains a warmer gas than cavity 72. This is due to heat transfer from strut liner 58. Strut shield 62 is disposed between strut liner 58 and strut 52 and is adapted to block a line-of-sight from strut liner 58 to strut 52. As used therein, block line-of-sight means that no portion of frame 42 is exposed to faring 46 travelling axially from a forward end of frame 42 to an aft end. Thus, to block line-of-sight a part of strut shield 62 is interposed between frame 42 and fairing 46. This configuration blocks or reduces radiant heat transfer from strut liner 58 to strut 52 and keeps secondary gas flow 60 (FIG. 2) contained adjacent strut 52 within second cavity 72. Cooler secondary gas flow 60 is directed into second cavity 72 and passes along strut 52 to keep strut 52 relatively cooler than strut liner 58.

The present application discloses a heat shield that can be positioned around a strut and between the strut and a fairing. This heat shield can direct a cooler secondary air flow along the strut to maximize effectiveness of the cooler air in cooling the strut before allowing the air to move away from the strut. Additionally, the application discloses the heat shield can be attached to a cooler component (e.g., cooler than fairing) such as an inner casing of the frame. This configuration avoids attachment of the heat shield to the fairing, which is undesirable due to conduction heating from the fairing to the heat shield. As a result of the configurations disclosed, the gas turbine engine can experience increased efficiency and less expensive materials can be used for construction of the fairing.

Discussion of Possible Embodiments

The following are non-exclusive descriptions of possible embodiments of the present invention.

An assembly for a gas turbine engine includes a strut and a heat shield. The heat shield is disposed adjacent the strut and the heat shield and is adapted to contain a cooling air flow that passes along first cavity between the heat shield and the strut.

The assembly of the preceding paragraph can optionally include, additionally and/or alternatively, any one or more of the following features, configurations and/or additional components:

a fairing disposed about the strut and the heat shield to form a main gas flow path for the gas turbine engine;

the heat shield directs the cooling air flow away from entering a second cavity formed between the heat shield and the strut;

the second cavity contains a warmer gas then the first cavity;

a forward portion of the heat shield is disposed in close proximity to and generally confirms to a shape of a forward portion of the fairing;

a forward portion of the heat shield is not connected to either the fairing or strut;

a rear portion of the heat shield is disposed in close proximity to and generally conforms to a shape of a rear portion of the strut;

an inner radial casing connected to the strut, and the heat shield is connected to and supported from the inner radial casing; and the heat shield that surrounds the strut is comprised of a single uninterrupted segment.

An assembly for a gas turbine engine includes a frame and a heat shield. The frame includes a strut and a casing. The heat shield is supported from the casing and disposed adjacent the strut to form a first cavity therebetween.

The assembly of the preceding paragraph can optionally include, additionally and/or alternatively, any one or more of the following features, configurations and/or additional components:

the first cavity receives a cooling air flow to cool the strut;

a fairing disposed about the strut and the heat shield to form a portion of a main gas flow path for the gas turbine engine;

the heat shield directs the cooling air flow away from entering a second cavity formed between the heat shield and the strut;

the second cavity contains a warmer gas then the first cavity;

a forward portion of the heat shield is disposed in close proximity to and generally confirms to a shape of a forward portion of the fairing;

a rear portion of the heat shield is disposed in close proximity to and generally conforms to a shape of a rear portion of the strut; and the heat shield that surrounds the strut is comprised of a single uninterrupted segment.

A stator assembly for a gas turbine engine includes a frame, a fairing, and a heat shield. The frame includes a strut. The fairing is disposed within the frame to form a main gas flow path for the gas turbine engine. The heat shield is disposed between the fairing and the strut, and the heat shield is adapted to separate a cooler air disposed in a first cavity that is formed between the heat shield and the strut from a warmer air disposed in a second cavity that is formed between the framing and the heat shield.

The assembly of the preceding paragraph can optionally include, additionally and/or alternatively, any one or more of the following features, configurations and/or additional components:

an inner radial casing connected to the strut, the heat shield is connected to and supported from the inner radial casing; and the heat shield that surrounds the strut is comprised of a single uninterrupted segment.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly for a gas turbine engine, comprising:
   a strut;
   a heat shield disposed adjacent the strut and the heat shield is adapted to contain a cooling air flow that passes along a first cavity between the heat shield and the strut, the heat shield comprising:
      a strut shield disposed around the strut; and
      a fairing disposed about the strut and the heat shield to form a portion of a main gas flow path for the gas turbine engine, wherein a forward portion of the strut shield is closer to a forward portion of the fairing than a forward portion of the strut as viewed in a cross section taken through the fairing, the heat shield, and the strut along a flow direction and between radially opposed ends of the fairing.

2. The assembly of claim 1, wherein the heat shield directs the cooling air flow away from entering a second cavity formed between the heat shield and the fairing.

3. The assembly of claim 2, wherein the second cavity contains a warmer gas than the first cavity.

4. The assembly of claim 1, wherein the forward portion of the strut shield generally conforms to a shape of the forward portion of the fairing.

5. The assembly of claim 4, wherein the forward portion of the strut shield is not connected to either the fairing or the strut.

6. The assembly of claim 1, wherein a rear portion of the strut shield is closer to a rear portion of the strut than a rear portion of the fairing, and wherein the rear portion of the strut shield generally conforms to a shape of the rear portion of the strut.

7. The assembly of claim 1, further comprising an inner radial casing connected to the strut, wherein the heat shield is connected to and supported from the inner radial casing.

8. The assembly of claim 1, wherein the heat shield that surrounds the strut is comprised of a single uninterrupted segment.

9. An assembly for a gas turbine engine, comprising:
   a frame including a strut and a casing;
   a heat shield supported from the casing and disposed adjacent the strut to define a first cavity therebetween, the heat shield comprising:
      a strut shield disposed around the strut; and
      a fairing disposed about the strut and the heat shield to form a portion of a main gas flow path for the gas turbine engine, wherein a forward portion of the strut shield is closer to a forward portion of the fairing than a forward portion of the strut as viewed in a cross section taken through the fairing, the heat shield, and the strut along a flow direction and between radially opposed ends of the fairing.

10. The assembly of claim 9, wherein the first cavity receives a cooling air flow to cool the strut.

11. The assembly of claim 9, wherein the heat shield directs the cooling air flow away from entering a second cavity formed between the heat shield and the fairing.

12. The assembly of claim 11, wherein the second cavity contains a warmer gas than the first cavity.

13. The assembly of claim 9, wherein the forward portion of the strut shield generally conforms to a shape of the forward portion of the fairing.

14. The assembly of claim 9, wherein a rear portion of the strut shield is closer to a rear portion of the strut than a rear portion of the fairing, and wherein the rear portion of the heat shield generally conforms to a shape of the rear portion of the strut.

15. The assembly of claim 9, wherein the heat shield that surrounds the strut is comprised of a single uninterrupted segment.

16. A stator assembly for a gas turbine engine, comprising:
 a frame including a strut;
 a fairing disposed within the frame to form a portion of a main gas flow path for the gas turbine engine;
 a heat shield disposed between the fairing and the strut, wherein the heat shield is adapted to separate a first portion of air disposed in a first cavity formed between the heat shield and the strut from a second portion of air disposed in a second cavity formed between the frame and the heat shield, wherein the first portion of air is cooler than the second portion of air; and
 an inner radial casing connected to the strut, wherein the heat shield is connected to and directly radially supported from the inner radial casing, the fairing is connected to and supported from the inner radial casing, and wherein the heat shield is connected at a different location than the fairing.

17. The assembly of claim 16, wherein the heat shield that surrounds the strut is comprised of a single uninterrupted segment.

* * * * *